Patented Sept. 10, 1929.

1,727,480

UNITED STATES PATENT OFFICE.

FRITZ MIETZSCH, OF ELBERFELD, GERMANY, ASSIGNOR TO WINTHROP CHEMICAL COMPANY, INC., OF NEW YORK, N. Y.

NEW DIALKYLAMINO-ALKYL DERIVATIVES OF THE 3.6-DIHYDROXYACRIDINE.

No Drawing. Application filed June 30, 1927, Serial No. 202,765, and in Germany July 8, 1926.

My present invention relates to new derivatives of 3.6.dihydroxyacridine having the general formula:

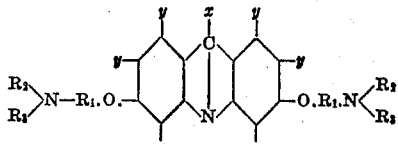

wherein $x$ stands for hydrogen or alkyl, $y$ for hydrogen, alkyl, alkoxyl or any other monovalent residue, and $R_1$, $R_2$ and $R_3$ for alkyl residues.

These products may be obtained in several ways, for instance, by causing a compound having the formula:

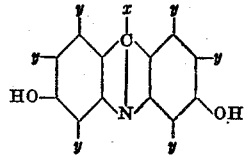

wherein $x$ stands for hydrogen or alkyl and $y$ for hydrogen, alkyl, alkoxyl or any other monovalent residue to be acted upon by an halogenalkylamine or to be acted upon at first by an halogenized alcohol and converting then the hydroxyalkyl-compounds thus obtained in a known manner into aminoalkyl ethers.

These products are excellent remedies against blood parasites. The free bases are oils or products of low melting points difficultly soluble in water, easily soluble in ether, alcohol or benzene. With mineral acids they form yellow hygroscopical salts, which dissolve in water with neutral reaction.

The following examples serve to illustrate my invention, without limiting it thereto, all parts being by weight.

*Example 1.*—211 parts 3.6-dihydroxyacridine are added to a solution of 46 parts sodium metal in 2000 ccm. absolute alcohol. Then 280 parts diethylaminoethylchloride are added. The reaction mixture is stirred for several hours while heating it gradually on the water bath. The liquid is then filtered from the sodium chloride formed and the alcohol distilled off in vacuo. The residue is readily dissolved in dilute hydrochloric acid. The solution is then filtered, and any unattacked 3.6-dihydroxyacridine remains on the filter. The acid solution is well cooled and treated with caustic soda lye, whereby the reaction product separates out as a solid, having the following formula:

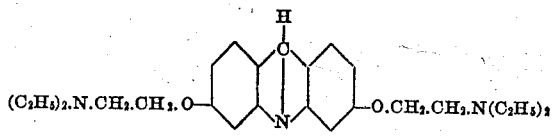

After being washed several times with water, it is dried in vacuo at ordinary temperature, then dissolved in nitro-benzene, diluted with ether and the hydrochloride is precipitated by means of ethereal hydrochloric acid. The new product is readily soluble in water with a clear pure yellow color.

*Example 2.*—23,9 parts 2.7.dimethyl-3.6-dihydroxyacridine are dissolved in 200 ccm. absolute alcohol. An additional portion of alcohol having sodium dissolved in it is then added. When treated as in Example 1, a compound is obtained having the formula:

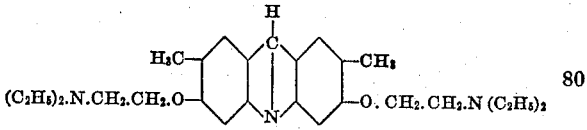

It is in a dry form a yellow, crystallized product, melting at 108° C. and being easily soluble in ether, alcohol, benzene and in diluted mineral acids. Its solution has a green-yellow fluorescence.

*Example 3.*—23,9 parts 2.7.dimethyl-3.6-dihydroxyacridine are added to a solution of 4,6 parts of sodium metal in 200 ccm. amyl-alcohol. Then 28 parts α-dimethylamino-γ-chlorobutane (obtainable by causing acetone, formaldehyde, and dimethylamine to react with each other, reducing the dimethylamino-γ-butanon thus obtained and introducing then a chlorine atom according to the process described in Ser. No. 52,230 filed August 24, 1925, in the name of Schulemann, Schonhofer and Wingler) are added. The whole is boiled 20 hours on the oil bath.

The further treatment is as described in Example 1. The product thus obtained has similar properties to those described in Examples 1 and 2 and has the formula:

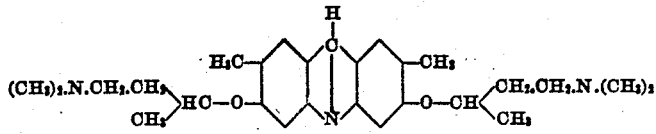

*Example 4.*—25,3 parts 2.7.9.-trimethyl-3.6-dihydroxyacridine are dissolved as described in Example 1 in absolute alcohol containing sodium dissolved in it. When treated with 28 parts of diethylamino-ethylchloride, a brilliant yellow product is obtained having the formula:

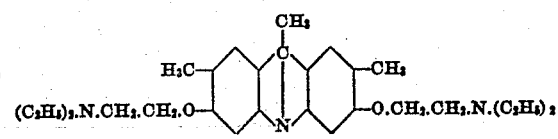

*Example 5.*—30 parts of the compound of the formula:

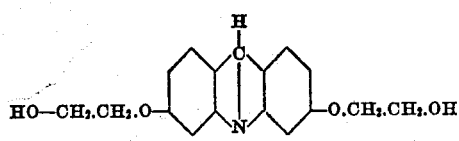

are dissolved in 300 ccm. benzene, and after adding 26 parts of thionylchloride the mass is heated eight hours on the water bath. The yellow chlorine hydrate of the compound of the formula:

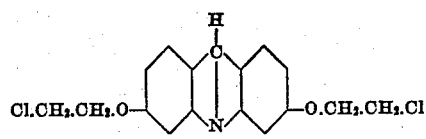

which separates, is filtered off, washed and then heated for eight hours together with 36,5 parts of diethylamine to a temperature of about 100° C. under elevated pressure. The reaction mixture is diluted with water; then soda lye is added until alkaline reaction takes place. The acridine base thus obtained is separated from the excess of diethylamine by distillation with steam. The hereby remaining base is extracted with ether. By adding a mixture of ether and hydrochloric acid, the same product is obtained as described in Example 1.

*Example 6.*—41,4 parts of the potassium salt of the 5.nitro-2-methoxy-1-hydroxybenzene are suspended in 414 ccm. xylene, 27 parts diethylaminoethylchloride are added and the whole is boiled during eight hours while stirring. The potassium chloride formed is filtered off, and the xylene is distilled off. The residue is then purified by distillation under a high vacuum. The distillate is a thick yellow-red oil boiling at 189–192° C. at a pressure of 1.5–2 m. m.

When reduced with iron and hydrochloric acid, the amine is obtained, being a colorless liquid boiling at 179–181° C. at a pressure of 1.5–2 m. m.

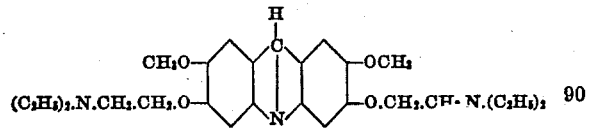

24 parts of the amine thus obtained are dissolved in a mixture of 250 ccm. water and 100 parts of concentrated sulfuric acid of 66° Bé., 5 ccm. of a formaldehyde solution of 30% strength are added and the whole is stirred several hours at room temperature. Then the mixture is gradually boiled for 3–4 hours. From the well-cooled orange-red solution the reaction product separates as an orange-yellow precipitate. The compound has the formula:

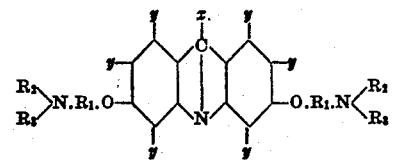

I claim:

1. As new products the compounds having the general formula:

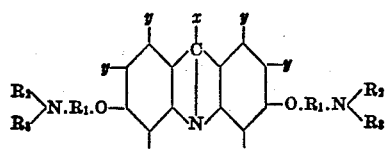

wherein $x$ stands for hydrogen or alkyl, $y$ for hydrogen, alkyl, alkoxyl or any other monovalent residue, and $R_1$, $R_2$, $R_3$ for alkyl residues, which are oils or products of low melting point, being difficultly soluble in water, easily soluble in ether, alcohol or benzene, forming yellow hygroscopical salts with mineral acids and possessing excellent properties against blood-parasites.

2. As new products the compounds of the following formula:

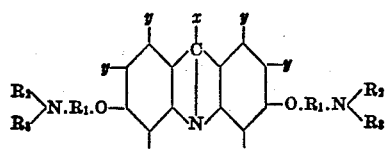

wherein $x$ stands for hydrogen or alkyl, $y$ for hydrogen, alkyl or alkoxyl, $R_1$ for any alkyl residue, $R_2$ and $R_3$ for methyl or ethyl, which are oils or products of low melting point being difficultly soluble in water, easily soluble in ether, alcohol or benzene, forming yellow hygroscopical salts with mineral acids and possessing excellent properties against blood-parasites.

3. As new products the compounds of the formula:

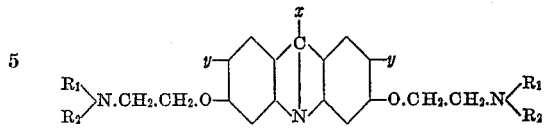

wherein $x$ stands for hydrogen or methyl, $y$ for hydrogen, alkyl or alkoxyl, $R_1$ and $R_2$ for methyl or ethyl, which are oils or products of low melting point being difficultly soluble in water, easily soluble in ether, alcohol or benzene, forming yellow hygroscopical salts with mineral acids and possessing excellent properties against blood-parasites.

4. As new products the compounds of the formula:

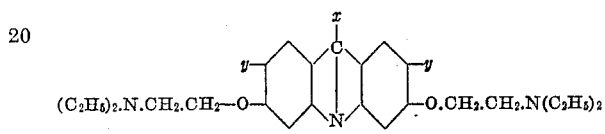

wherein $x$ stands for hydrogen or methyl and $y$ for hydrogen, methyl or methoxyl, which are oils or products of low melting point being difficultly soluble in water, easily soluble in ether, alcohol or benzene, forming yellow hygroscopical salts with mineral acids and possessing excellent properties against blood-parasites.

5. As a new product the compound of the formula:

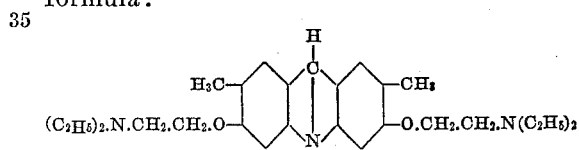

which is in a dry form a yellow, crystallized product, melting at 108° C., being easily soluble in ether, alcohol, benzene and in diluted mineral acids, its solution having a green-yellow fluorescence and possessing excellent properties against blood-parasites.

In testimony whereof I have hereunto set my hand.

FRITZ MIETZSCH.